United States Patent
Onishi

(10) Patent No.: US 9,321,369 B2
(45) Date of Patent: Apr. 26, 2016

(54) POWER CONVERSION SYSTEM

(71) Applicant: Yukio Onishi, Nagoya (JP)

(72) Inventor: Yukio Onishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 14/198,149

(22) Filed: Mar. 5, 2014

(65) Prior Publication Data

US 2014/0285002 A1 Sep. 25, 2014

(30) Foreign Application Priority Data

Mar. 22, 2013 (JP) .................................. 2013-061002

(51) Int. Cl.
*B60L 11/00* (2006.01)
*B60L 15/00* (2006.01)
*H02M 1/32* (2007.01)
*H02M 1/08* (2006.01)

(52) U.S. Cl.
CPC ............... *B60L 15/007* (2013.01); *H02M 1/32* (2013.01); *B60L 2240/525* (2013.01); *B60L 2240/526* (2013.01); *H02M 1/08* (2013.01)

(58) Field of Classification Search
None
See application file for complete search history.

(56) References Cited

U.S. PATENT DOCUMENTS

2006/0033552 A1\* 2/2006 Ishikawa et al. .............. 327/432

FOREIGN PATENT DOCUMENTS

| JP | 04-017574 A | 1/1992 |
|---|---|---|
| JP | A-2006-54933 | 2/2006 |
| JP | A-2007-28741 | 2/2007 |
| JP | 2007-174781 A | 7/2007 |
| JP | 2008-118829 A | 5/2008 |
| JP | 2009-136115 A | 6/2009 |

\* cited by examiner

*Primary Examiner* — Hal Kaplan
*Assistant Examiner* — Aqeel Bukhari
(74) *Attorney, Agent, or Firm* — Oliff PLC

(57) ABSTRACT

A power conversion system includes: a switching element; an output circuit that outputs a transmission signal for transmitting information on a physical quantity that indicates a state of the switching element and for transmitting information on abnormality of the switching element; an isolating element that transmits the transmission signal in an electrically isolated state; a filter that deletes the information on the physical quantity from a signal transmitted through the isolating element; a control circuit to which the signal transmitted through the isolating element but not through the filter is input; and a shutdown circuit that shuts down power supply to the switching element on the basis of the signal through the filter.

18 Claims, 5 Drawing Sheets

POWER CONVERSION SYSTEM

INCORPORATION BY REFERENCE

The disclosure of Japanese Patent Application No. 2013-061002 filed on Mar. 22, 2013 including the specification, drawings and abstract is incorporated herein by reference in its entirety.

BACKGROUND OF THE INVENTION

1. Field of the Invention

The present invention relates to a power conversion system that includes a switching element.

2. Description of Related Art

For example, Japanese Patent Application Publication No. 2007-28741 (JP 2007-28741 A) discloses a technique to display a degradation level of a switching element included in a power converter by estimating a temperature variation range of the switching element on the basis of an input current value or an output current value of the power converter.

The above related art for estimating a temperature of the switching element by utilizing the input/output current values has low accuracy of detection when compared to a technique for detecting the temperature of the switching element by a temperature sensor. However, in order to detect a physical quantity, such as the temperature, of the switching element operated under high voltage and transmit the quantity to a low-voltage circuit, an isolating element is necessary to transmit an electrical signal between electrically isolated circuits. This causes a difficulty in securement of a space for a circuit board.

SUMMARY OF THE INVENTION

The present invention provides a power conversion system in which a space for a circuit board can easily be secured.

A first aspect of the present invention is a power conversion system that includes: a switching element; an output circuit that outputs a transmission signal for transmitting information on a physical quantity that indicates a state of the switching element and for transmitting information on abnormality of the switching element; an isolating element that transmits the transmission signal in an electrically isolated state; a filter that deletes the information on the physical quantity from a signal transmitted through the isolating element; a control circuit to which the signal transmitted through the isolating element but not through the filter is input; and a shutdown circuit that shuts down power supply to the switching element on the basis of the signal through the filter.

According to the present invention, it is possible to easily secure a space for the circuit board.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
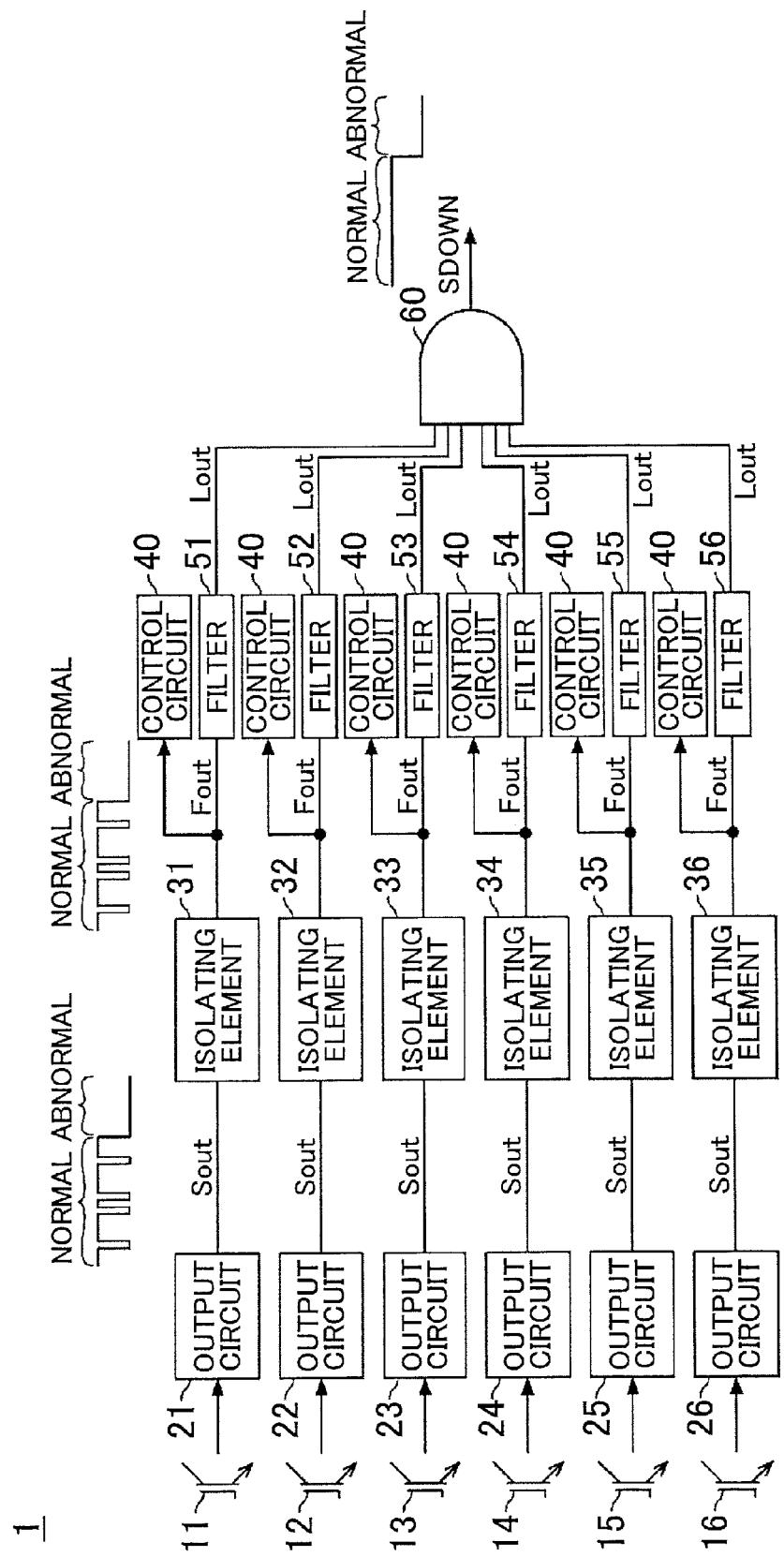
FIG. 1 is a schematic configuration diagram for showing an example of a power conversion system according to one embodiment of the present invention.

FIG. 1 is a configuration diagram for schematically showing a power conversion system 1 according to one embodiment of the present invention. The power conversion system 1 is a system that is installed in a vehicle such as a so-called hybrid vehicle that includes an electric motor as a traveling drive source, for example. The power conversion system 1 is, for example, used for an inverter control system for driving the electric motor.

The power conversion system 1 includes switching elements 11 to 16, output circuits 21 to 26, isolating elements 31 to 36, filters 51 to 56, control circuits 40, and a shutdown circuit 60. The power conversion system 1 includes an output circuit, an isolating element, and a filter for each of the plural switching elements 11 to 16.

Each of the switching elements 11 to 16 is a semiconductor element included in an inverter for an ON/OFF operation. For example, each of the switching elements 11 to 16 is a U-phase upper arm, V-phase upper arm, W-phase upper arm, U-phase lower arm, V-phase lower arm, or W-phase lower arm. Each of the switching elements 11 to 16 may be, for example, a voltage controlled power element by an insulated gate or a bipolar transistor such as an IGBT or a MOSFET.

The output circuit 21 is a circuit that outputs a transmission signal Sout to the isolating element 31 with two functions of transmitting information on a physical quantity that represents a state of the switching element 11 and transmitting information on abnormality of the switching element 11. The output circuit 22 is a circuit that outputs the transmission signal Sout to the isolating element 32 with two functions of transmitting information on a physical quantity that represents a state of the switching element 12 and transmitting information on abnormality of the switching element 12. The same applies to the output circuits 23 to 26.

For example, information on a temperature of the switching element itself or a temperature of a periphery of the switching element, information on a current value that flows through the switching element, information on a voltage value that is applied to the switching element, or the like can be raised as the information on the physical quantity that represents the state of the switching element.

For example, information on temperature abnormality indicating overheating of the switching element, information on current abnormality indicating a flow of overcurrent through the switching element, information on voltage abnormality indicating application of overvoltage to the switching element, or the like can be raised as the information on abnormality of the switching element. In addition, the information on abnormality of the switching element may be information on OFF abnormality indicating that the switching element having received an ON command remains OFF (open failure information), information on ON abnormality indicating that the switching element having received an OFF command remains ON (short failure information), or the like.

Each of the isolating elements 31 to 36 is an element that electrically isolates between a high-voltage circuit operated with a power ground reference (the switching elements 11 to 16, the output circuits 21 to 26) and a low-voltage circuit operated with a signal ground reference that differs from the power ground reference (the control circuits 40, the filters 51 to 56, and the shutdown circuit 60). Each of the isolating elements 31 to 36 equivalently converts the transmission signal Sout for which the power ground serves as a reference potential to a transmission signal Fout for which the signal ground serves as a reference potential. An optical-coupling isolating element such as a photocoupler can be raised as a concrete example of the isolating elements 31 to 36.

The isolating element 31 brought the transmission signal Sout that is output from the output circuit 21 into an electrically isolated state and transmits it to the control circuit 40 and the filter 51, and the isolating element 32 brought the transmission signal Sout that is output from the output circuit 22 into an electrically isolated state and transmits it to the control circuit 40 and the filter 52. The same applies to the isolating elements 33 to 36.

The filter 51 is a means of deleting the information on the physical quantity of the switching element 11 from the transmission signal Fout that is transmitted through the isolating element 31, and the filter 52 is a means of deleting the information on the physical quantity of the switching element 12 from the transmission signal Fout that is transmitted through the isolating element 32. The same applies to the filters 53 to 56. A low-pass filter can be raised as a concrete example of the filters 51 to 56.

The control circuit 40 is a circuit that receives the transmission signal Fout that is transmitted through the isolating elements 31 to 36 respectively but not through the filters 51 to 56 respectively. A microcomputer including a CPU can be raised as a concrete example of the control circuit 40.

The control circuit 40 obtains the information on the physical quantity of the switching elements 11 to 16 respectively from the transmission signal Fout, and performs a predetermined operation based on the information on the physical quantity that has been obtained. For example, based on the obtained information on the physical quantity, the control circuit 40 outputs a command signal to drive the switching elements 11 to 16 respectively for switching, determines a degradation level of the switching elements 11 to 16 respectively, or transmits the obtained information on the physical quantity to another circuit.

The control circuit 40 also obtains the information on abnormality of the switching elements 11 to 16 respectively from the transmission signal Fout, and performs a predetermined operation based on the information on abnormality that has been obtained. For example, based on the obtained information on abnormality, the control circuit 40 stops output of the command signal to drive the switching elements 11 to 16 respectively for switching or transmits the obtained information on abnormality to another circuit.

The shutdown circuit 60 is a circuit that outputs a shutdown signal SDOWN to shut down power supply to a part or all of the switching elements 11 to 16 on the basis of each filter output signal Lout transmitted through one of the filters 51 to 56.

The shutdown circuit 60 is a circuit that shuts down the power supply to the switching element of which the information on abnormality is obtained when the filter output signal Lout contains the information on abnormality of the switching element. For example, the shutdown circuit 60 shuts down the current flowing to the switching element 11 when the filter output signal Lout transmitted through the filter 51 contains the information on abnormality of the switching element 11.

The shutdown circuit 60 may be a circuit that shuts down the power supply to the normal switching circuit(s) in addition to the power supply to the switching element of which the information on abnormality is obtained when the filter output signal Lout contains the information on abnormality of the at least one switching element. For example, the shutdown circuit 60 shuts down the current flowing to all of the switching elements 11 to 16 when the filter output signal Lout transmitted through the filter 51 contains the information on abnormality of the switching element 11. Just as described, it is possible with such shutdown to prevent the normal switching elements from being influenced by abnormality of a part of the switching elements, for example.

The shutdown circuit 60 may be a circuit that shuts down the power supply to the normal switching element that opposes the switching element of which the information on abnormality is obtained in addition to the power supply to the switching element of which the information on abnormality is obtained when the filter output signal Lout contains the information on abnormality of the switching element. For example, the shutdown circuit 60 shuts down the current flowing to the switching element 11 (the U-phase upper arm) and the switching element 14 (the U-phase lower arm) when the filter output signal Lout transmitted through the filter 51 contains the information on abnormality of the switching element 11. Just as described, it is possible with such shutdown to prevent through current from flowing through both of the upper and lower arms when the information on abnormality is the information on failure of one of the upper and lower arms and the other of the anus is brought into the ON state, for example.

It should be noted that the shutdown circuit 60 needs not output the shutdown signal SDOWN when none of the filter output signals Lout contains the information on abnormality of the switching element. Thus, the power supply to any of the switching elements 11 to 16 is not shut down.

As described above, in the power conversion system 1 of this embodiment, the transmission signal Sout serves to transmit both the information on the physical quantity of the switching element and the information on abnormality of the switching element. Therefore, although the isolating elements 31 to 36 are included, it is possible to easily secure a space for a circuit board.

In other words, if the information on the physical quantity of the switching element and the information on abnormality of the switching element are transmitted through separate transmission paths, the separate isolating elements are also needed to transmit the information on the physical quantity and the information on abnormality, and it is thus difficult to secure a space for the circuit board on which the isolating elements are mounted. On the contrary, in the power conversion system 1 of this embodiment, because the information on the physical quantity and the information on abnormality are transmitted by the shared transmission signal Sout, the transmission path and the isolating element used to transmit the information on the physical quantity and the information on abnormality can also be shared. Accordingly, it is possible to easily secure a space for a circuit board on which the isolating elements 31 to 36 are mounted. In addition, the circuit board can easily be downsized due to simplification thereof, and this further leads to easy cost reduction by sharing the components.

In addition, because the information on the physical quantity of the switching element is deleted from the filter output signal Lout by the filters 51 to 56, it is possible to prevent the shutdown circuit 60 from performing erroneous shutdown of the power supply to the switching element based on the information on the physical quantity contained in the filter output signal Lout.

Next, the power conversion system 1 of this embodiment will be described in more detail.

The output circuit 21 is a circuit that changes frequencies of the transmission signal Sout for transmitting the information on the physical quantity of the switching element 11 and for transmitting the information on abnormality of the switching element 11, for example. In other words, the frequency of the transmission signal Sout at which the information on the physical quantity of the switching element 11 is transmitted and the frequency of the transmission signal Sout at which the information on abnormality of the switching element 11 is transmitted differ from each other. The same applies to the output circuits 22 to 26.

Accordingly, because the control circuit 40 can identify a type of the information contained in the transmission signal Fout on the basis of a difference in the frequency of the transmission signal Fout received by the control circuits 40, it is possible to prevent the erroneous identification of the information on the physical quantity and the information on abnormality by the control circuit 40.

For example, the output circuits 21 to 26 may lower the frequency of the transmission signal Sout when transmitting the information on abnormality of the switching element, in comparison with the frequency at which the information on the physical quantity of the switching element is transmitted. Particularly, as shown in FIG. 1, the output circuits 21 to 26 may stop transmitting the information on the physical quantity of the switching element and start transmitting the information on abnormality of the switching element by maintaining a voltage level of the transmission signal Sout for a predetermined time period. Because the information on abnormality is transmitted at the lower frequency than the frequency at which the information on the physical quantity is transmitted, it is possible to efficiently transmit the information on the physical quantity that has a larger data volume than the information on abnormality.

For example, the output circuits 21 to 26 transmit only the information on the physical quantity of the switching element in the transmission signal Sout in a normal state where the abnormality of the switching element is not detected, and transmit only the information on abnormality of the switching element in the transmission signal Sout when the abnormality of the switching element is detected.

Figure 2:
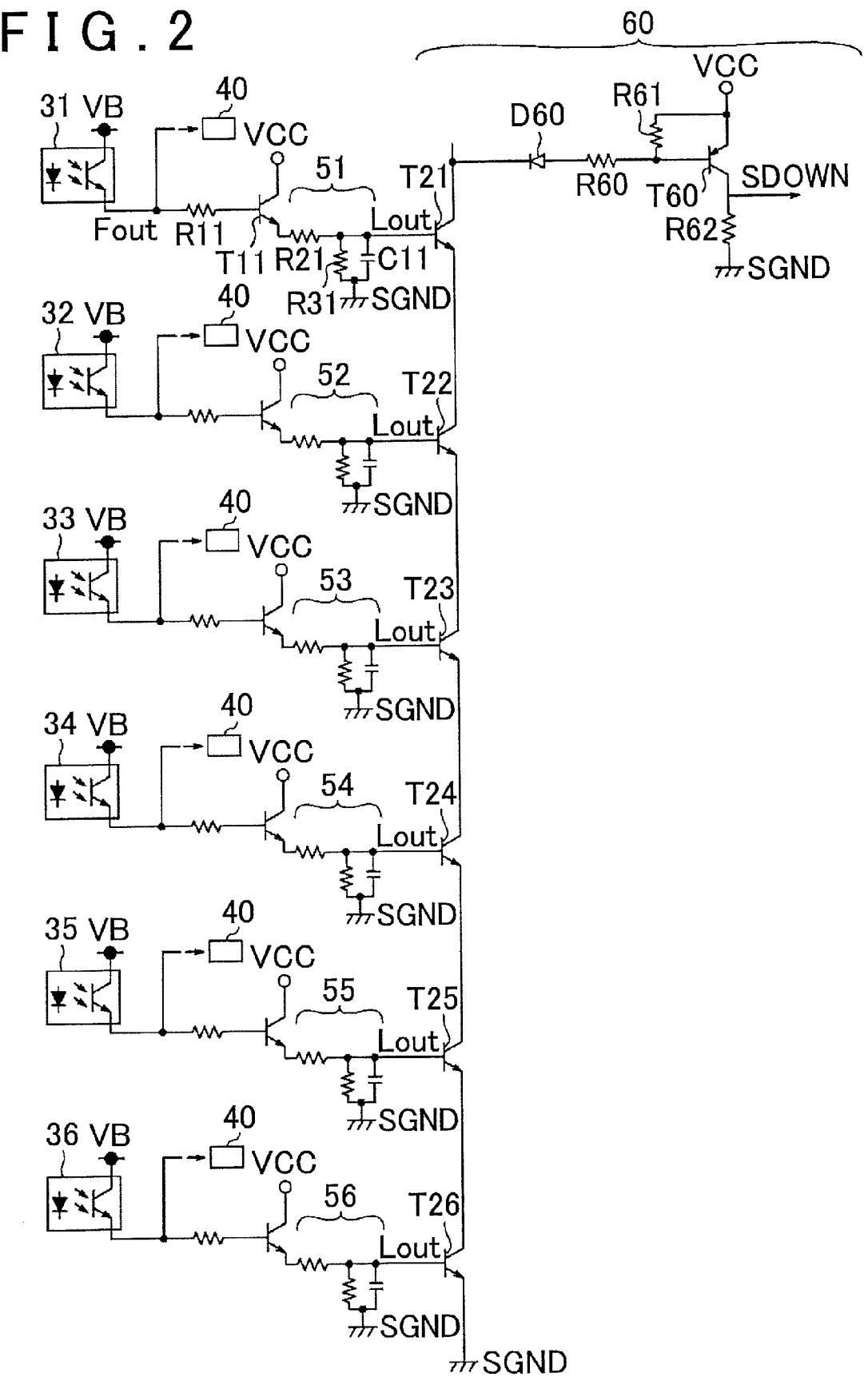
FIG. 2 shows concrete examples of a signal transmission circuit from an isolating element to a shutdown circuit through a filter circuit in the embodiment.

FIG. 2 shows a concrete example of a signal transmission circuit from the isolating elements to the shutdown circuit through the filter circuits. FIG. 2 shows output-side circuits of the isolating elements in the signal transmission circuit, each of which is operated with a signal ground SGND being a reference. A voltage value of power supply voltage VB is higher than that of power supply voltage VCC. In FIG. 2, photocouplers represent the isolating elements 31 to 36 while RC low-pass filters represent the filters 51 to 56.

An output section of the isolating element 31 is connected to an input section of the filter 51 through a base resistor R11 and an NPN bipolar transistor T11. A node between the output section of the isolating element 31 and the base resistor R11 is connected to an input section of the control circuit 40. Accordingly, the transmission signal Fout can be input to the input section of the control circuit 40 by serial communication without intervention of the filter 51. The filter 51 is a smoothing circuit that includes: an RC circuit having an input resistor R21 and a capacitor C11; and a resistor R31 that is connected in parallel with the capacitor C11. The isolating elements 32 to 36 and the filters 52 to 56 have the same circuit structures.

The shutdown circuit 60 includes NPN transistors T21 to T26, each having a base to which the filter output signal Lout output from one of the filters 51 to 56 is input. The NPN transistors T21 to T26 are connected in series such that a collector and an emitter of the adjacent transistors are connected. The collector of the NPN transistor T21 that is located on the highest side of all the NPN transistors T21 to T26 is pulled up to the power supply voltage VCC through a diode D60 and resistors R60, R61.

The shutdown circuit 60 includes a PNP transistor T60 that has a base connected to a connection node between the resistor R60 and the resistor R61, an emitter connected to the power supply voltage VCC, and a collector connected to the signal ground SGND through a resistor R62. The shutdown signal SDOWN is output from the connection node between the collector of the PNP transistor T60 and the resistor R62.

The transmission signal Fout that includes a plurality of pulses is attenuated by passing through one of the filters 51 to 56, and the filter output signal Lout that is a signal after the attenuation is input to the base of one of the NPN transistors T21 to T26.

In a state where the transmission signal Sout (input to one of the isolating elements 31 to 36 and output as the transmission signal Lout) transmits the information on the physical quantity of the switching element, a circuit constant of the signal transmission circuit is determined such that a voltage level of the shutdown signal SDOWN is fixed to an inactive level (a high level, for example). On the other hand, in a state where the transmission signal Sout (input to one of the isolating elements 31 to 36 and output as the transmission signal Fout) transmits the information on abnormality of the switching element, the circuit constant of the signal transmission circuit is determined such that the voltage level of the shutdown signal SDOWN is fixed to an active level (a low level, for example). The power supply to the switching element is shut down when the voltage level of the shutdown signal SDOWN is the active level, and the power supply to the switching element is not shut down when the voltage level of the shutdown signal SDOWN is the inactive level.

For example, during the transmission of the information on the physical quantity, the circuit constant of the signal transmission circuit is determined such that the PNP transistor T60 is constantly ON (the shutdown signal SDOWN is fixed to the high level) even when the filter output signal Lout after the attenuation turns ON or OFF the NPN transistors T21 to T26. On the other hand, during the transmission of the information on abnormality, the circuit constant of the signal transmission circuit is determined such that the PNP transistor T60 is constantly OFF (the shutdown signal SDOWN is fixed to the low level) when the filter output signal Lout after the attenuation fixes any of the NPN transistors T21 to T26 to an OFF state for a predetermined time period or longer.

Figure 3:
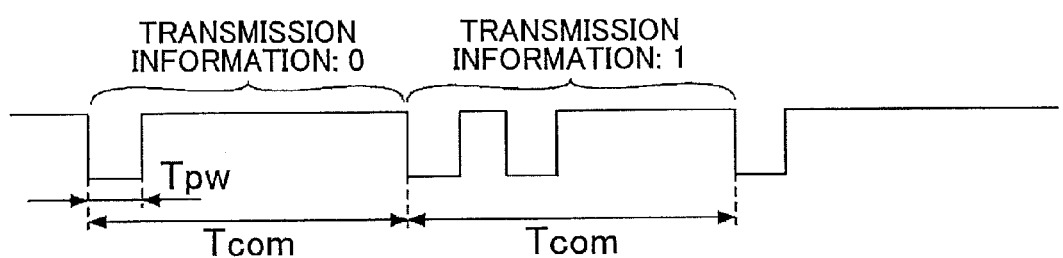
FIG. 3 shows a specification example of a signal pulse that forms a transmission signal in the embodiment.

FIG. 3 shows a specification example of a signal pulse that forms the transmission signal Sout. The transmission signal Sout is a binary digital signal. A minimum pulse width Tpw of the transmission signal Sout is set to correspond to a transmission delay time Td_pc between input and output of the isolating element or longer so that the transmission signal Sout is equivalently and correctly converted to the transmission signal Fout. Meanwhile, a 1-bit communication cycle Tcom indicates a time used for to transmit one bit of transmission information (0 or 1) in the transmission signal Sout. The 1-bit communication cycle Tcom is set to an integer multiple of the minimum pulse width Tpw (10 times, for example) so that the voltage level is not fixed for a predetermined time period or longer even when the same 1 or 0 continues.

Figure 4:
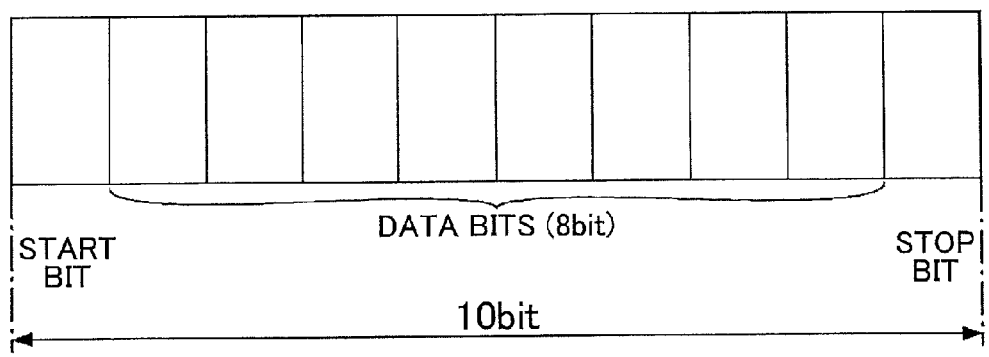
FIG. 4 shows a specification example of communication of the transmission signal.

FIG. 4 shows a specification example of asynchronous (start-stop synchronization) communication of the transmission signal Sout. For example when the 1-bit communication cycle Tcom is 1 ms, a length of a 10-bit data frame is 10 ms. The 10-bit data frame contains a 1-bit start bit, a 1-bit stop bit, and an 8-bit data bits that is set between the start bit and the stop bit. For example, the data bits of 8 bits stores a type of the information on the physical quantity (for example, 10: current information, 01: temperature information) in upper 2 bits and stores data contents of the information on the physical quantity (the current value, the temperature, etc.) in lower 6 bits (resolution: $2^6$).

Each of the filters 51 to 56 has a cutoff frequency that is an inverse of the minimum pulse width Tpw of the transmission signal Sout or lower such that 1 pulse of the transmission signal Fout is cut off to accurately delete the information on the physical quantity contained in the transmission signal Fout.

Figure 5:
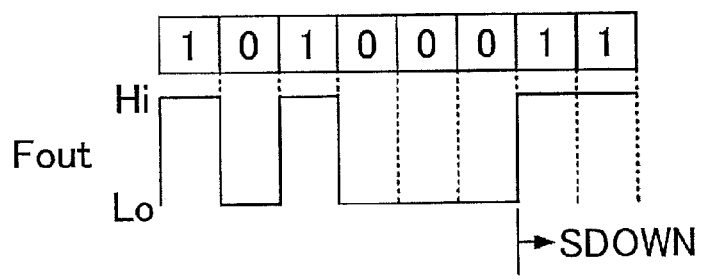
FIG. 5 shows a specification example of a signal in which data 1 or 0 is represented by one bit.

For example, in a communication specification like FIG. 5 in which the data of 1 or 0 is represented by 1 bit in the Fout signal, the low level continues when 0s continue. Accordingly, in the circuit exemplified in FIG. 2, there is a possibility that the shutdown signal SDOWN erroneously becomes active (the low level) when any of the NPN transistors T21 to T26 is turned OFF for the predetermined time period or longer.

Figure 6:
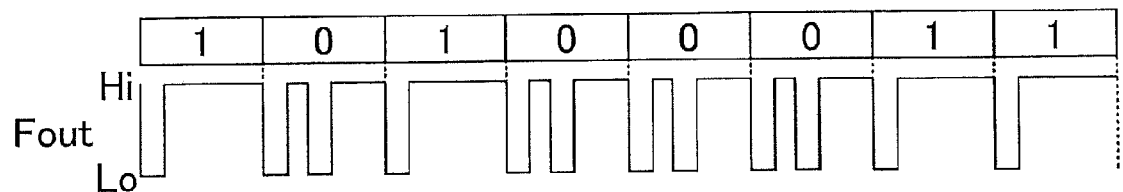
FIG. 6 shows a specification example of the signal in which data 1 or 0 is represented by two bits or more.

On the other hand, in a communication specification like FIG. 6 in which the data of 1 or 0 is represented by 2 bits or more in the Fout signal (for example, data 1 is 0111 . . . , and data 0 is 0101 . . . in FIG. 6), a time period during which the signal is in the low level is equal to or shorter than a time period for the single data of 0 or 1. Accordingly, even when 0s continue, the low level of the signal does not continue. Therefore, in the circuit exemplified in FIG. 2, even when data of 0s continue, the NPN transistors T21 to T26 are turned on, and it is thus possible to prevent the shutdown signal SDOWN from erroneously becoming active (the low level).

For example, when the minimum pulse width Tpw is set to 300 µs, the transmission delay time Td_pc is set to 300 µs, the 1-bit communication cycle Tcom is set to 3 ms, the circuit constant in FIG. 2 may be set as follows: R11 is set to 5 kΩ, R21 is set to 10 kΩ, R31 is set to 60 kΩ, C11 is set to 0.1 µF, R60 is set to 5 kΩ, R61 is set to 5 kΩ, R62 is set to 10 kΩ.

Figure 7:
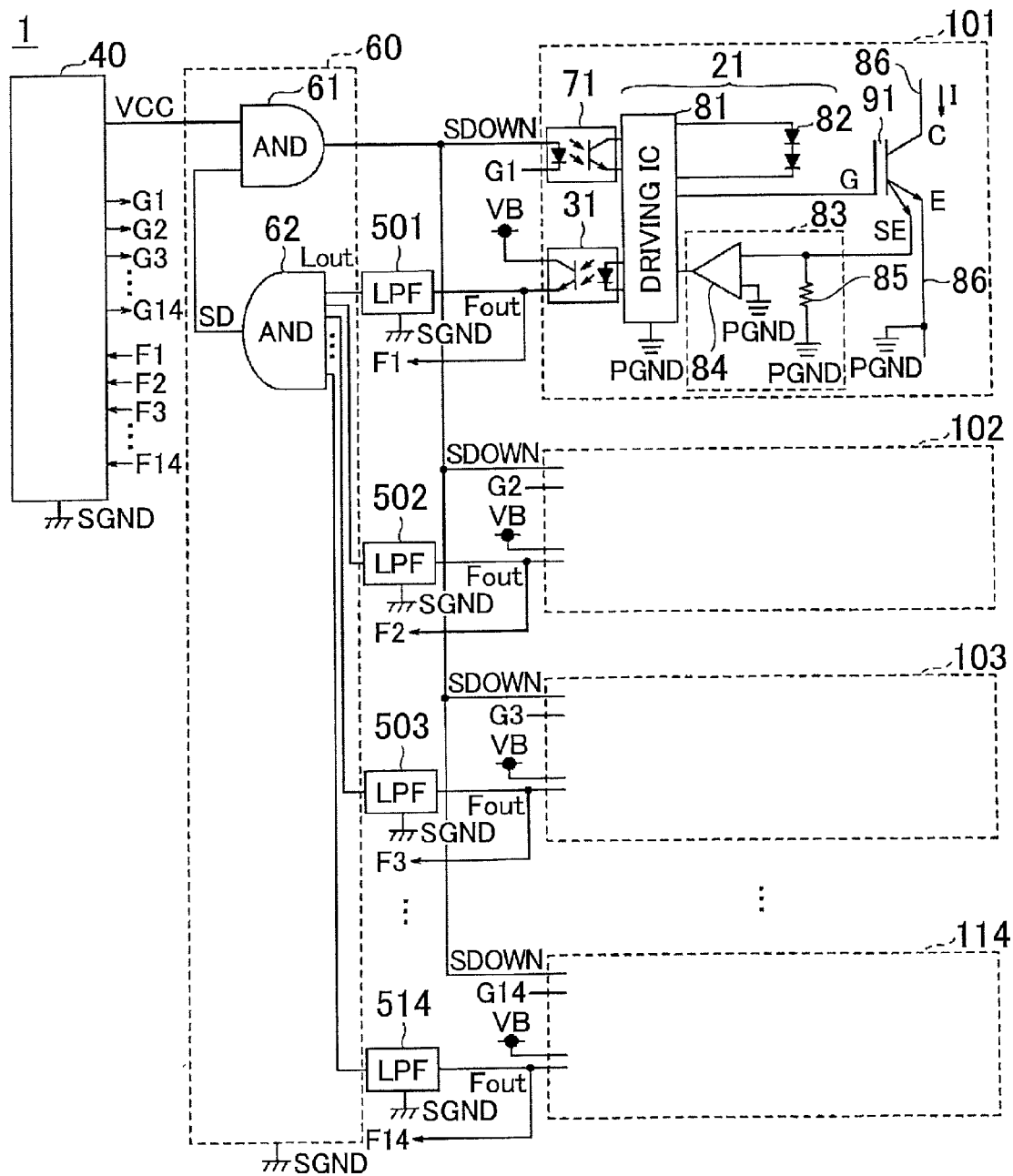
FIG. 7 is a configuration view for showing a concrete example of the power conversion system according to the embodiment of the present invention.

FIG. 7 is a view for showing a concrete example of the power conversion system 1. The power conversion system 1 of FIG. 7 is formed of a plurality of units and has: an electronic control unit including circuits (the control circuits 40, the shutdown circuit 60, and low-pass filters 501 to 514) that are operated with the signal ground SGND being the reference; and an electronic control unit including circuits (arm circuits 101 to 114) that are operated with a power ground PGND being a reference, for example.

In a case of FIG. 7, the power conversion system 1 includes the plural arm circuits 101 to 114. The power conversion system 1 includes: two three-phase bridge circuits, each of which is configured to include the six arm circuits; and a switching power supply circuit that is configured to include the two arm circuits on the high side and the low side, for example, and thus includes a total of the 14 arm circuits 114".

Because all of the arm circuits 101 to 114 have the same circuit configuration, only the arm circuit 101 will be described.

The arm circuit 101 includes an isolating element 71, a driving IC 81, an IGBT 91 with a current sensing terminal, a temperature sensor 82, a current sensor 83, and the isolating element 31. The driving IC 81, the IGBT 91, the temperature sensor 82, and the current sensor 83 are integrated on a same chipboard.

The power supply voltage VCC output from the control circuits 40 is input to an AND circuit 61 of the shutdown circuit 60. When none of the IGBTs 91 included in the arm circuits 101 to 114 is detected for abnormality, output of an AND circuit 62 of the shutdown circuit 60 is fixed to the high level. Accordingly, the high-level power supply voltage VCC is applied to an input terminal in an input portion of the isolating element 71. Thus, the control circuit 40 outputs a command signal G1 that is selectively switched between the high level and the low level and can thereby transmit the command signal G1 to the driving IC 81 in the electrically isolated state. The driving IC 81 carries out ON/OFF driving of the IGBT 91 according to the command signal that is supplied from the isolating element 71. Because the IGBT 91 is driven ON or OFF, a desired current I flows in a current path 86 in which the IGBT 91 is inserted.

As the output circuit 21 that outputs the transmission signal Sout for transmitting the information on the physical quantity that indicates the state of the IGBT 91 and for transmitting the information on abnormality of the IGBT 91, the arm circuit 101 includes the temperature sensor 82, the current sensor 83, and the driving IC 81.

The temperature sensor 82 detects a temperature of the IGBT 91. The driving IC 81 obtains temperature information of the IGBT 91 by monitoring the voltage that is detected by the temperature sensor 82. The current sensor 83 detects the current I that flows between main electrodes (between the collector and the emitter) of the IGBT 91. The current sensor 83 outputs detected voltage that is voltage at both ends of the resistor 85 and is amplified by an amplifier 84, the resistor 85 being connected to a sense emitter terminal SE of the IGBT 91. The driving IC 81 obtains current value information of the IGBT 91 by monitoring the voltage that is detected by the current sensor 83.

The temperature information and the current value information of the IGBT 91 are the information on the physical quantity that indicates the state of the IGBT 91. The driving IC 81 outputs the transmission signal Sout that contains the detected temperature information and/or the detected current value information to the isolating element 31.

When the detected temperature is a predetermined temperature or higher, the driving IC 81 determines that the IGBT 91 is overheated and outputs the transmission signal Sout (the low-level transmission signal Sout) that contains temperature abnormal information to the isolating element 31. Alternatively, when the detected current value is a predetermined current value or higher, the driving IC 81 determines that the overcurrent flows through the IGBT 91 and outputs the transmission signal Sout (the low-level transmission signal Sout) that contains current abnormal information to the isolating element 31.

The isolating element 31 converts the transmission signal Sout to the transmission signal Fout. The transmission signal Fout is input to the low-pass filter 501 and is also input to an input terminal F1 of the control circuit 40.

The low-pass filter 501 outputs the filter output signal Lout, which corresponds to the transmission signal Fout from which the information on the physical quantity of the IGBT 91 is deleted, to the AND circuit 62 of the shutdown circuit 60. The same applies to the other low-pass filters 502 to 514. Accordingly, due to the intervention of the low-pass filters 501 to 514, it is possible to prevent a circumstance where the operation of the IGBT 91 is erroneously shut down by the shutdown circuit 60 when the pulse of the transmission signal Fout that transmits the information on the physical quantity is input thereto regardless of no occurrence of abnormality of the IGBT 91.

The control circuit 40 detects the abnormality of the IGBT 91 when the transmission signal Fout that contains the information on abnormality thereof is input to the input terminal F1. Meanwhile, the transmission signal Fout that contains the information on abnormality is input to the low-pass filter 501, and the low-level filter output signal Lout is output. In other words, the signal input to the AND circuit 62 is fixed to the low level. Accordingly, when the filter output signal Lout from any one of the low-pass filters 501 to 514 is fixed to the low level for the predetermined time period or longer, a shutdown signal SD that is output from the AND circuit 62 is fixed to the low level. When the shutdown signal SD that is fixed to the low level is input to the AND circuit 61, the shutdown signal SDOWN that is output from the AND circuit 61 is fixed to the low level.

As a result, supply of each of the command signals G1 to G14 for driving the IGBT 91 included in one of the arm circuits 101 to 114 is shut down from the control circuit 40 to the driving IC 81 included in the one of the arm circuits 101 to 114 through the isolating element. Accordingly, even when the abnormality of the IGBT 91 is not detected, the IGBT 91 can immediately be stopped (local shutdown is permitted) without waiting for the command signal from the control circuit 40 to stop the IGBT 91.

A description has been made so far on the embodiment of the power conversion system; however, the present invention is not limited to the above-described embodiment. Various modifications and improvements, such as combination or replacement with a part or all of other embodiments, can be made within the scope of the present invention.

For example, as a different aspect from that shown in FIG. 1, the power conversion system may include the control circuit and the shutdown circuit for each of the plural switching elements. In addition, for example, the coupling method of the isolating element is not limited to the optical coupling method used for the photocoupler but may be a magnetic coupling method or a capacitive coupling method. Furthermore, the information on abnormality of the switching element may include the information on abnormality of a power conversion device that includes an arm circuit or a plurality of arm circuits. Moreover, a method of shutting down the power supply to the switching element may be: stopping supply of the control signal to a control electrode of a gate or the like of the switching element so as to turn off the switching element; controlling an electric charge of the control electrode so as to turn off the switching element; or shutting down the current path 86 (see FIG. 7) with another switch or the like.

What is claimed is:

1. A power conversion system, comprising:
a switching element;
an output circuit that outputs a transmission signal for transmitting information on a physical quantity that indicates a state of the switching element and for transmitting information on abnormality of the switching element;
an isolating element that transmits the transmission signal in an electrically isolated state;
a filter that deletes the information on the physical quantity from a signal transmitted through the isolating element;
a control circuit to which the signal transmitted through the isolating element but not through the filter is input, wherein the output of the isolating element is directly connected to the filter and the control circuit; and
a shutdown circuit that shuts down power supply to the switching element based on the signal transmitted through the filter.

2. The power conversion system according to claim 1, wherein the shutdown circuit shuts down the power supply to the switching element when the signal transmitted through the filter contains the information on abnormality.

3. The power conversion system according to claim 1, wherein the output circuit changes a frequency of the transmission signal between a case where the information on the physical quantity is transmitted and a case where the information on abnormality is transmitted.

4. The power conversion system according to claim 3, wherein the output circuit changes the frequency of the transmission signal in the case where the information on abnormality of the switching element is transmitted to be lower than that in the case where the information on the physical quantity is transmitted.

5. The power conversion system according to claim 1, wherein the output circuit stops transmitting the information on the physical quantity and starts transmitting the information on abnormality by fixing a level of the transmission signal for a predetermined time period or longer.

6. The power conversion system according to claim 1, wherein the filter has a cutoff frequency that is equal to or lower than an inverse of a minimum pulse width of the transmission signal.

7. The power conversion system according to claim 1, wherein a minimum pulse width of the transmission signal is equal to or longer than a transmission delay time in the isolating element.

8. The power conversion system according to claim 1, further comprising a drive circuit that drives the switching element, wherein the shutdown circuit stops the drive circuit from driving the switching element.

9. The power conversion system according to claim 8, wherein the shutdown circuit shuts down supply of a command signal for driving the switching element from the control circuit to the drive circuit.

10. A power conversion system, comprising:
a switching element;
an output circuit that outputs a transmission signal for transmitting information on a physical quantity that indicates a state of the switching element and for transmitting information on abnormality of the switching element;
an isolating element that transmits the transmission signal in an electrically isolated state;
a filter that deletes the information on the physical quantity from a signal transmitted through the isolating element;
a control circuit having an input that receives a signal transmitted from the isolated element, wherein the isolated element does not receive a signal that goes through the filter; and
a shutdown circuit that shuts down power supply to the switching element based on the signal transmitted through the filter.

11. The power conversion system according to claim 10, wherein the shutdown circuit shuts down the power supply to the switching element when the signal transmitted through the filter contains the information on abnormality.

12. The power conversion system according to claim 10, wherein the output circuit changes a frequency of the transmission signal between a case where the information on the physical quantity is transmitted and a case where the information on abnormality is transmitted.

13. The power conversion system according to claim 12, wherein the output circuit changes the frequency of the transmission signal in the case where the information on abnormality of the switching element is transmitted to be lower than that in the case where the information on the physical quantity is transmitted.

14. The power conversion system according to claim 10, wherein the output circuit stops transmitting the information on the physical quantity and starts transmitting the information on abnormality by fixing a level of the transmission signal for a predetermined time period or longer.

15. The power conversion system according to claim 10, wherein the filter has a cutoff frequency that is equal to or lower than an inverse of a minimum pulse width of the transmission signal.

16. The power conversion system according to claim 10, wherein a minimum pulse width of the transmission signal is equal to or longer than a transmission delay time in the isolating element.

17. The power conversion system according to claim 10, further comprising a drive circuit that drives the switching element, wherein the shutdown circuit stops the drive circuit from driving the switching element.

18. The power conversion system according to claim 17, wherein the shutdown circuit shuts down supply of a command signal for driving the switching element from the control circuit to the drive circuit.

* * * * *